United States Patent [19]

Thomson et al.

[11] 4,229,823

[45] Oct. 21, 1980

[54] DIGITAL CLOCK PHASE RECOVERY CIRCUITS FOR DATA RECEIVER

[75] Inventors: David J. Thomson, Murray Hill; Roland J. Turner, Somerville, both of N.J.

[73] Assignee: Bell Telephone Laboratories, Incorporated, Murray Hill, N.J.

[21] Appl. No.: 47,021

[22] Filed: Jun. 11, 1979

[51] Int. Cl.³ .................................................. H04L 7/00

[52] U.S. Cl. ...................................... 375/113; 328/155

[58] Field of Search ............... 375/110, 111, 113, 114, 375/116, 118, 23, 25, 55; 328/119, 155; 340/347 DD, 146.3 Z

[56] References Cited

U.S. PATENT DOCUMENTS

| | | | |
|---|---|---|---|
| 3,404,231 | 10/1968 | Aaron et al. | 375/113 |
| 3,659,286 | 4/1972 | Perkins et al. | 375/55 |
| 3,820,031 | 6/1974 | Smithlin | 328/119 |
| 3,967,061 | 6/1976 | Dobias | 375/110 |
| 4,029,900 | 6/1977 | Addeo | 375/114 |
| 4,088,831 | 5/1978 | Butcher et al. | 375/110 |
| 4,142,065 | 2/1979 | Tannhäuser | 375/55 |

*Primary Examiner*—Thomas A. Robinson
*Attorney, Agent, or Firm*—Charles S. Phelan

[57] ABSTRACT

To stabilize the phase of bit rate clock signals recovered from a self-clocking data signal, e.g., a Manchester coded signal, extra signal level transition pulses (58) occurring during intervals of successive bits of the same info bit type are inverted (59) to reinforce the desired phase of the bit-rate frequency component.

6 Claims, 3 Drawing Figures

Cp∠0°
MANCHESTER DECODER
18
DATA TO CONTROLLER 16
19
SYNC RECOVERY
DATA OR VOICE CONTROL SIG
31
DATA GATING
PROG RESET
30
RESET CONTROL LOGIC
GATED DATA (NRZ)
32
I.P. GENERATING LOGIC
I.P.
40
CLOCK AQUISITION
37
SOFT LIMITER
42
38
SIGNAL PROCESSING (DERIVE COV)
DTS
DTS
Cp∠90°
Cp∠0°
39
SIGNAL PROCESSING (DERIVE DTS)
41
36
35
RESET
FILTERED CHARACTER INDICATOR
MODE (DATA OR VOICE)
WORD SYNC LOGIC
WORD-SYNC

DIGITAL CLOCK PHASE RECOVERY CIRCUITS FOR DATA RECEIVER

BACKGROUND OF THE INVENTION

This invention relates to bit clock phase recovery circuits for data transmission systems. The invention relates particularly to such systems operating in a mode where each data message is of approximately voice syllabic length and appears in an asynchronously positioned time interval.

PRIOR ART

Self-clocking binary coded data signals, e.g., those sometimes designated as Manchester coded signals, are characterized by a signal level transition occurring in each bit interval in a direction which is indicative of the binary signal information type. Various ways are known in the art to recover the phase of the data bit clock frequency from such a data signal, and many of these schemes are based on the detection of signal level transitions. However, when successive data information bits are of the same type, these transitions occur more frequently and can give rise to phase ambiguity. Thus, in the E. J. Addeo U.S. Pat. No. 4,029,900, the approximate bit rate phase information is recovered by full wave rectifying the baseband data and filtering the desired frequency component. However, even in integrated circuit versions of such an arrangement, there can be significant imbalances among rectifier diodes; and these have been found to cause the filtered component to favor one or the other of two different phases which are 180 electrical degrees apart.

A J. J. Dobias U.S. Pat. No. 3,967,061 shows an arrangement for detecting transitions and coupling a train of corresponding pulses through a monostable multivibrator having an unstable interval time constant which is greater than one-half the period of the bit rate. Thus, excess pulses during adjacent like bit intervals are ignored. However, in this type of arrangement, the results are unreliable if the received data signals have been provided by way of a noisy channel because, e.g., a noise pulse can initiate monostable operation prematurely and cause blanking of the desired transition pulse. This is also true of such a channel which is characterized by frequent signal level fades. A C. R. Perkins et al. U.S. Pat. No. 3,659,286 and a J. R. Smithlin U.S. Pat. No. 3,820,031 illustrate earlier variations on the same theme of utilizing a pulse stretching technique to blank out consideration of excess pulses.

In an M. R. Aaron et al. U.S. Pat. No. 3,404,231, combined input signal and supplementary tone signal samples are binary coded and averaged over a suitable time interval so that the most significant bit pulse has a much greater magnitude and opposite polarity as compared to any other bit position pulse. This relationship is used at the receiving station to indicate whether or not the received data signal is in correct word framing without concern for bit phase.

J. A. W. Butcher U.S. Pat. No. 4,088,831 generates a receiver bit clock as a function of the position modulation of line transitions of at least one bit in a PCM word.

An A. Tannhauser U.S. Pat. No. 4,142,065 discloses a system in which a pulse shaping filter is utilized to form each received data bit into a particular bipolar configuration which, it is alleged, can be relatively accurately detected. This patent does not address details of a receiver that is operative in the presence of noise and fading.

SUMMARY OF THE INVENTION

Problem effects in the prior art are diluted in accordance with the present invention by producing a train of information-transition-related pulses and utilizing excess transition pulses during sequences of like data information bits to reinforce the phase of the correct bit rate frequency component.

In one embodiment of the invention, the phase reinforced bit rate information is utilized to produce a stable bit rate clock signal. The latter signal, shifted in phase by a predetermined amount, is utilized to sample the train of transition pulses and invert the excursion direction within the train of any pulses found between train pulses of the correct phase.

BRIEF DESCRIPTION OF THE DRAWING

A more complete understanding of the invention and the various features, objects, and advantages thereof may be obtained from a consideration of the following detailed description and the appended claims in connection with the attached drawing, in which:

DETAILED DESCRIPTION

Figure 1:
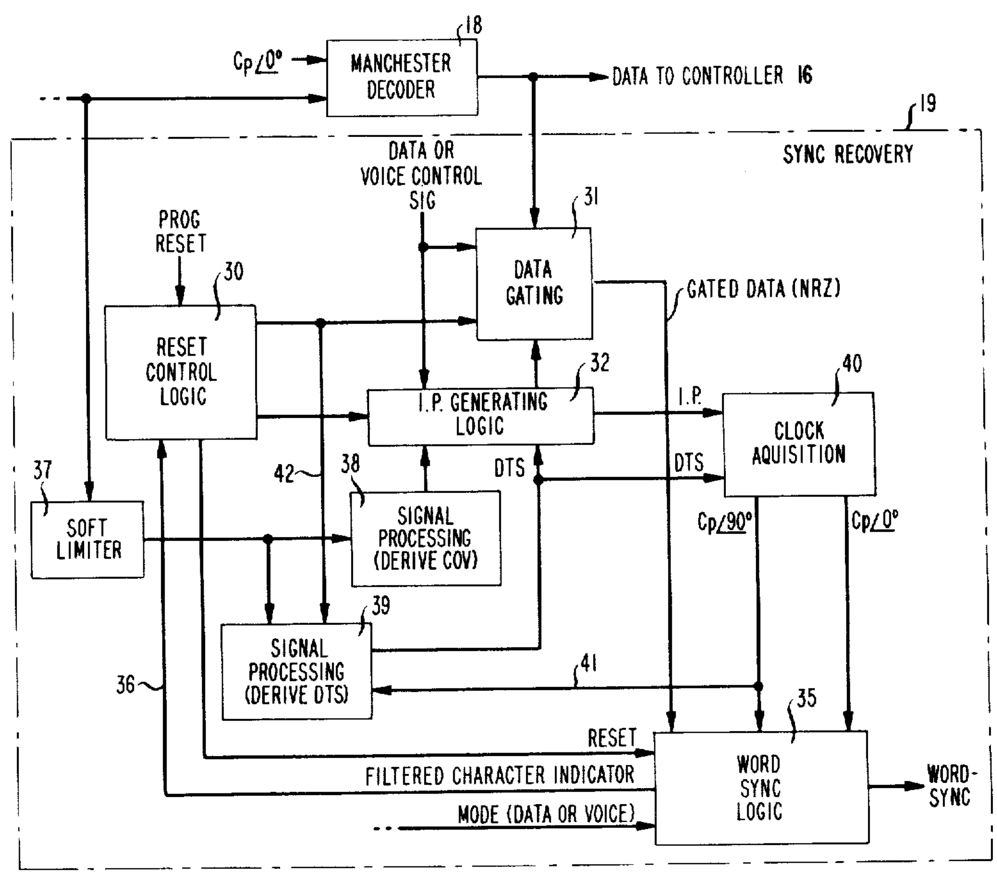
FIG. 1 is a simplified block and line diagram of synchronizing signal recovery circuits in a system utilizing the invention.

For convenience of description, the present invention will be disclosed in the environment of the system of the aforementioned Addeo patent. The full disclosure of that patent is hereby incorporated by reference as though included herein in its entirety. Nonetheless, for the convenience of readers, FIG. 1 in the present application is a copy of a diagram of the synchronizing recovery circuits of the Addeo patent and modified in accordance with the present invention. This diagram is not fully described herein other than to indicate that baseband data signals from a discriminator in a radiotelephone transceiver are applied through a signal processing circuit 39 in accordance with the present invention to derive an approximate bit rate timing signal DTS containing bit rate phase information along with received signal interruptions, noise, and fades. The DTS signal is applied to a clock acquisition circuit 40 (advantageously a digital phase locked loop) for producing an output bit rate clock signal which is stable in frequency and phase and which is employed in word sync recovery logic 35. The clock signal Cp/90 degrees, which is the 90-degree-phase-shifted version of the stable clock, is coupled by a lead 41 to the signal processing circuit 39 for use in accordance with the present invention.

A filtered character indicator signal is applied from the logic 35 on a lead 36 to reset control logic 30 which is used for initiating operation of the illustrated synchronizing signal recovery circuits. An output of the logic 30 which is applied to a data gating circuit 31 is also applied in accordance with the present invention by way of a lead 42 to the circuit 39.

Figure 2:
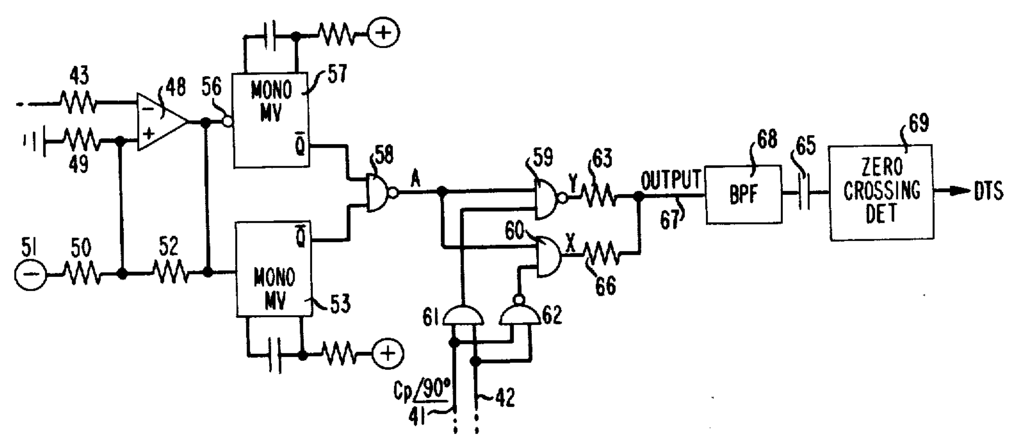
FIG. 2 is a schematic diagram illustrating signal processing circuits for obtaining a derived timing signal employed in the system of FIG. 1.

FIG. 2 illustrates the implementation of the signal processing circuit 39 in accordance with the present invention. The baseband data signal, typically 10 kilobit per second Manchester coded data, from the transceiver discriminator (not shown) is coupled through a current limiting resistor 43 to the inverting input connection of an operational amplifier comparator 48. That comparator has its noninverting input coupled to an intermediate tap on a potential divider including resistors 49 and 50 connected in series between a negative voltage supply 51 and ground so that the comparator operates with respect to a reference at approximately −0.1 volt. Thus, the comparator effectively trips at ±0.1 volt display a hysteresis effect which blocks out low level noise. A feedback resistor 52 couples the comparator output to the noninverting input.

That same comparator output is applied directly to trigger a first monostable multivibrator 53, and it is also applied through an inverting input connection 56 to trigger a further monostable multivibrator 57. Each monostable circuit is provided with a resistor-capacitor time constant circuit such that the unstable operating interval following triggering of the monostable circuit is a relatively small fraction, e.g., less than one-fourth and typically about 5% to 10%, of a bit interval, of the received data. Thus, the monostable 53 is triggered on positive-going transitions of the received data, and the monostable 57 is triggered on negative-going transitions of the data.

$\overline{Q}$ outputs of the two monostables are applied to different inputs of a NAND gate 58. Since those two inputs are normally high except for a brief interval following a data transition, the output of gate 58 includes a train of narrow positive-going pulses, each occurring at a different transition of the Manchester coded data.

Figure 3:
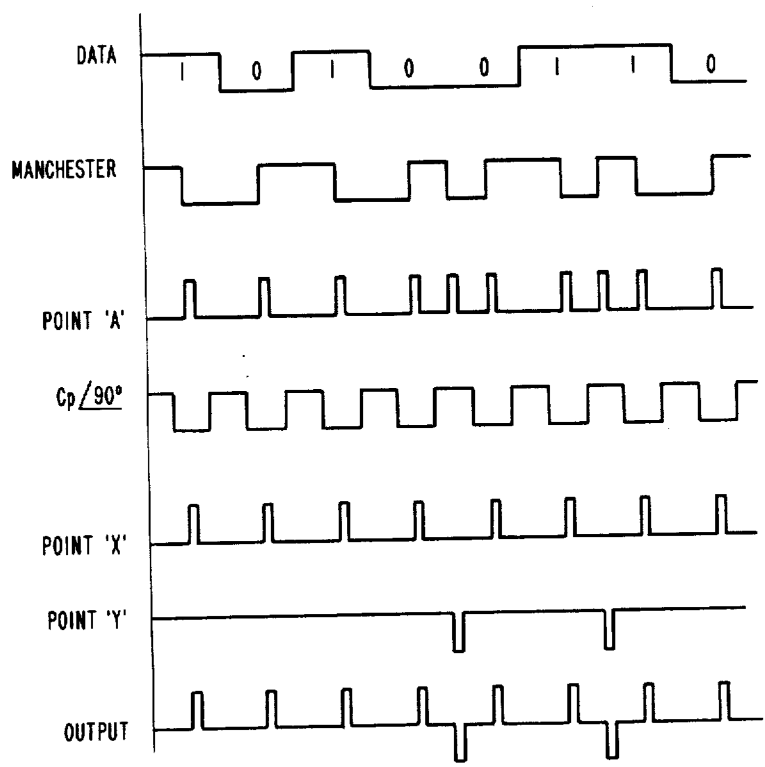
FIG. 3 is a family of signal wave diagrams illustrating operation of the circuit of FIG. 2.

The signal wave relationships for the FIG. 2 circuit are illustrated in FIG. 3 wherein the first diagram illustrates a nonreturn-to-zero (NRZ) data sequence. The second diagram illustrates the Manchester coded form thereof which is applied via the resistor 43 in FIG. 2, and the Point A diagram illustrates the pulse train format in the output of gate 58.

That output of gate 58 is applied to an input of each of a NAND gate 59 and an AND gate 60. Outputs of an AND gate 61 and a NAND gate 62 are coupled to second input connections of the gates 59 and 60, respectively, for enabling or disabling the latter gates.

Prior to the production of a filtered character indicator, lead 36 in FIG. 1 is low and causes lead 42 in FIG. 2 also to be low (logical ZERO level). This forces the output of AND gate 61 to be low and the output of NAND gate 62 to be high regardless of the state of the clock signals on lead 41. This has the effect of disabling gate 59 and enabling gate 60 so that the Point A signal of FIG. 3 is coupled through gate 60 relatively unchanged.

Signal from the lead 42 goes high when a filtered character indication (lead 36) has been produced and stays high until a transceiver programmed reset occurs. That high lead 42 signal enables both of the gates 61 and 62. During positive-going excursions of the bit rate clock signal on lead 41, gate 61 couples the phase shifted clock signal pulses from lead 41 to enable the gate 59 while the same clock signals, inverted by gate 62, disable gate 60.

Thus, pulses of the Point A wave which occur during positive-going clock pulses are inverted by gate 59 and to become the Point Y pulse train. Between positive-going clock pulses the low clock signal disables gate 62 so that an enabling signal is applied to the gate 60 and Point A pulses occurring at those times are coupled through gate 60 to become the Point X pulse train.

It can be seen from the time symmetrical bit rate clock signal wave diagram in FIG. 3 that the clock pulses cause gate 59 to be enabled at the time edge of each NRZ data bit interval while the gate 60 is enabled during approximately the midpoint of each such bit interval. Consequently, the output of gate 60, i.e., the Point X wave in FIG. 3, is a train of narrow pulses occurring approximately midway in each bit interval. Similarly, the output of gate 59, i.e., the Point Y wave in FIG. 3, includes a negative-going pulse only at a bit interval time edge between like information bits in the NRZ data sequence.

Outputs of gates 59 and 60 are coupled through resistors 63 and 66, respectively, to a lead 67 where they appear combined in the form illustrated by the OUTPUT wave in FIG. 3. This wave corresponds to the wave A in the sense that the mid-bit-time pulses in wave A retain their positive-going excursion sense in the OUTPUT whereas the bit-edge pulses between like information bits in the NRZ data have inverted excursion directions in OUTPUT. Thus, the latter pulses, which in wave A tended to appear as a strong frequency component at twice the bit rate, are now inverted. Their only effect in the OUTPUT wave is to reinforce the desired phase of the bit rate frequency component, i.e., the phase of the digitally represented information.

The OUTPUT wave on lead 67 is coupled through an active, bit rate (10 kilohertz center frequency in one embodiment), bandpass filter 68 and direct current blocking capacitor 65 to a comparator 69 which operates as a zero crossing detector. Capacitor 65 reduces filter 68 time bias offset in the filtered OUTPUT signal. Output from the comparator 69 is then applied through a buffer amplifier (not shown) to provide the DTS signal of FIG. 1.

Although the present invention has been described in connection with a particular embodiment thereof, it is to be understood that additional embodiments, applications, and modifications, which will be obvious to those skilled in the art, are included within the spirit and scope of the invention.

We claim:

1. In a data transmission system for data signals in which there is in each data bit time at least one signal transition between binary information signal levels in a direction that is indicative of the data information bit state, and circuits are provided for recovering from the data signals bit clock phase information, the method for deriving that bit clock phase information which includes the steps of generating a pulse of a single predetermined polarity in response to each data signal level transition in either direction between binary signal level states and thereby producing a train of unipolar pulses having a bit-rate frequency component, sampling said train periodically approximately midway between information-state-representative transition times, and reversing the excursion direction in the train of any pulse detected in the sampling step for thereby reinforcing the phase of the bit rate frequency component of the train.

2. In a signal transmission system wherein self-synchronizing data signals are transmitted, a circuit (39) for deriving phase information from the data and including means (53, 57, 58) for producing a pulse of predetermined polarity in response to each data signal level transition in either direction, the improvement comprising means (59) for inverting the excursion direction of any of said pulses occurring approximately at a time edge of a bit interval.

3. The system in accordance with claim 2 in which said producing means comprises a pair of opposite-polarity-edge-triggered monostable trigger circuits (53, 57) coupled to be actuated by signal level transitions in said data signals, each of said trigger circuits producing when triggered a pulse of much shorter duration than the duration of one-half of a bit interval in said data, and said inverting means comprises means for combining (58, 59, 60, 63, 66) pulse train outputs of said trigger circuits to produce a further pulse train having a sequence of unipolar pulses at the bit rate but further having between successive like data bits an oppositely poled pulse approximately midway between successive pairs of unipolar pulses.

4. The system in accordance with claim 3 which comprises in addition means (41) for applying stable bit rate signals, and means (61, 62) responsive to said stable bit rate signals for enabling said combining means, 5. The system in accordance with claim 4 in which said combining means comprises a NAND gate (58) connected to receive outputs of both of said trigger circuits, an output connection (67), means (60, 62, 66) for coupling the output of said NAND gate to said output connection in response to each stable bit clock signal, and means (61, 59, 63) for coupling an inverted output of said NAND gate to said output connection between said stable bit clock signals.

6. The system in accordance with claim 3 which comprises in addition means (35) for producing a data message character indicating signal, and means (61) responsive to absence of said indicating signal for disabling said inverting means for the transmission of said oppositely pole pulses.

* * * * *